(12) United States Patent
Cannon et al.

(10) Patent No.: US 8,185,829 B2
(45) Date of Patent: May 22, 2012

(54) METHOD AND SYSTEM FOR RATING EXCHANGEABLE GESTURES VIA COMMUNICATIONS IN VIRTUAL WORLD APPLICATIONS

(75) Inventors: Ulysses L. Cannon, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 12/349,586

(22) Filed: Jan. 7, 2009

(65) Prior Publication Data
US 2010/0175002 A1 Jul. 8, 2010

(51) Int. Cl.
G06F 3/00 (2006.01)

(52) U.S. Cl. .................. 715/757; 715/706; 715/848

(58) Field of Classification Search .................. 715/706, 715/848–852
See application file for complete search history.

(56) References Cited

U.S. PATENT DOCUMENTS

| | | | |
|---|---|---|---|
| 5,566,291 A * | 10/1996 | Boulton et al. | 715/709 |
| 5,835,087 A * | 11/1998 | Herz et al. | 715/810 |
| 5,880,731 A * | 3/1999 | Liles et al. | 715/758 |
| 5,884,029 A | 3/1999 | Brush et al. | |
| 6,904,410 B1 * | 6/2005 | Weiss et al. | 705/26.61 |
| 6,954,728 B1 * | 10/2005 | Kusumoto et al. | 705/14.4 |
| 7,209,895 B2 * | 4/2007 | Kundtz et al. | 705/14.4 |
| 7,249,139 B2 * | 7/2007 | Chuah et al. | 1/1 |
| 7,269,794 B2 | 9/2007 | Martinez et al. | |
| 7,713,116 B2 * | 5/2010 | Keam et al. | 463/1 |
| 2002/0059120 A1 | 5/2002 | Milton | |
| 2003/0014423 A1 | 1/2003 | Chuah et al. | |
| 2003/0036944 A1 * | 2/2003 | Lesandrini et al. | 705/10 |
| 2005/0223328 A1 | 10/2005 | Ashtekar et al. | |
| 2006/0288041 A1 * | 12/2006 | Plastina et al. | 707/104.1 |
| 2007/0113181 A1 | 5/2007 | Blattner et al. | |
| 2007/0143128 A1 * | 6/2007 | Tokarev et al. | 705/1 |
| 2008/0215975 A1 * | 9/2008 | Harrison et al. | 715/706 |
| 2009/0070180 A1 * | 3/2009 | Jung et al. | 705/8 |
| 2009/0174702 A1 * | 7/2009 | Garbow et al. | 345/419 |
| 2009/0285483 A1 * | 11/2009 | Guven et al. | 382/181 |
| 2009/0307608 A1 * | 12/2009 | Kalasapur et al. | 715/753 |
| 2010/0083112 A1 * | 4/2010 | Dawson et al. | 715/706 |
| 2010/0138316 A1 * | 6/2010 | Connors et al. | 705/27 |
| 2010/0275141 A1 * | 10/2010 | Scherpa et al. | 715/765 |
| 2011/0126122 A1 * | 5/2011 | Forman et al. | 715/745 |

OTHER PUBLICATIONS

"Kelly's VP Vault" Copyright 2000, http://www.reocities.com/BourbonStreet/Delta/4381/vp.html.
U.S. Appl. No. 12/349,598: Specification, Jan. 7, 2009.
U.S. Appl. No. 12/349,598: Non-Final Office Action, Aug. 22, 2011.

* cited by examiner

*Primary Examiner* — Ryan Pitaro
(74) *Attorney, Agent, or Firm* — The Law Office of Jim Boice

(57) ABSTRACT

A method, system and computer-readable medium are disclosed for rating exchangeable gestures in a virtual world application. The method includes making a gesture owned by a first user of the virtual world application available to a second user of the virtual world application; in response to the second user providing a rating of the gesture, storing the rating in a repository of the first user, determining a rating metric of the gesture using at least the rating received from the second user, and communicating the rating metric to a third user of the virtual world application.

19 Claims, 3 Drawing Sheets

METHOD AND SYSTEM FOR RATING EXCHANGEABLE GESTURES VIA COMMUNICATIONS IN VIRTUAL WORLD APPLICATIONS

BACKGROUND OF THE INVENTION

A virtual world (such as Second Life by Linden Research, Inc.) is a computer-based simulated environment intended for its users to inhabit and interact via avatars. Avatars are computer representations of the user typically depicted as textual, two-dimensional, or three-dimensional graphical representations. Some, but not all, virtual worlds allow for multiple users.

The computer accesses a computer-simulated world and presents perceptual stimuli to the user, who in turn can manipulate elements of the modeled world to experience a "telepresence" to a certain degree. Such modeled worlds may appear similar to the real world or may alternatively depict fantasy worlds. The modeled world may simulate rules based on the real world or a fantasy world. Example rules include gravity, topography, locomotion, real-time actions, and communication. Communication between users has ranged from text, graphical icons, visual gesture, sound, and even communication forms using touch and balance senses.

Massively multiplayer online games commonly depict a world similar to the real world, with real world rules and real-time actions, and communication. Communication is usually textual, with real-time voice communication using voice over IP (VOIP) also possible. Virtual worlds are not limited to games but, depending on the degree of immediacy presented, can encompass computer conferencing and text based chat rooms. Sometimes, emoticons or 'smilies' are available, to show feeling or facial expression. Emoticons often have a keyboard shortcut.

Within Second Life, for example, there are two main methods of text-based communication: local chat and global instant messaging (IM). Chatting is used for public localized conversations between two or more avatars and can be "heard" by avatars that are within twenty meters of each other. IM is used for private conversations, either between two avatars or between the members of a group. Unlike chatting, IM communication does not depend on the participants being within a certain distance of each other. In addition, audio communication via VOIP between users is also available.

Gestures are assets that can trigger animations from the user interface within virtual word applications. In Second Life, for example, gestures can be triggered when the user types pre-defined function keys or keywords (such as typing "/bow" to perform a bow), where keywords can be used in lieu of a function key to make the user's avatar execute the associated animation. U.S. patent application Ser. No. 12/349,598 titled "Gesture Exchange Via Communications In Virtual World Applications", incorporated by reference herein, discloses a method for exchanging gestures between users. What is needed is a way for users to rate exchangeable gestures.

BRIEF SUMMARY OF THE INVENTION

The present invention provides a method, system and computer-readable medium for rating exchangeable gestures between users in a virtual world application. In one embodiment, the method includes making a gesture owned by a first user of the virtual world application available to a second user of the virtual world application; in response to the second user providing a rating of the gesture from the second user: storing the rating in a repository of the first user, determining a rating metric of the gesture using at least the rating received from the second user, and communicating the rating metric to a third user of the virtual world application.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

An illustrative embodiment of the present invention is directed to a method, system and computer-readable medium for exchanging gestures between users via communications in virtual world applications. The present invention can take the form of an entirely hardware embodiment, an entirely software embodiment or an embodiment containing both hardware and software elements. In an illustrative embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
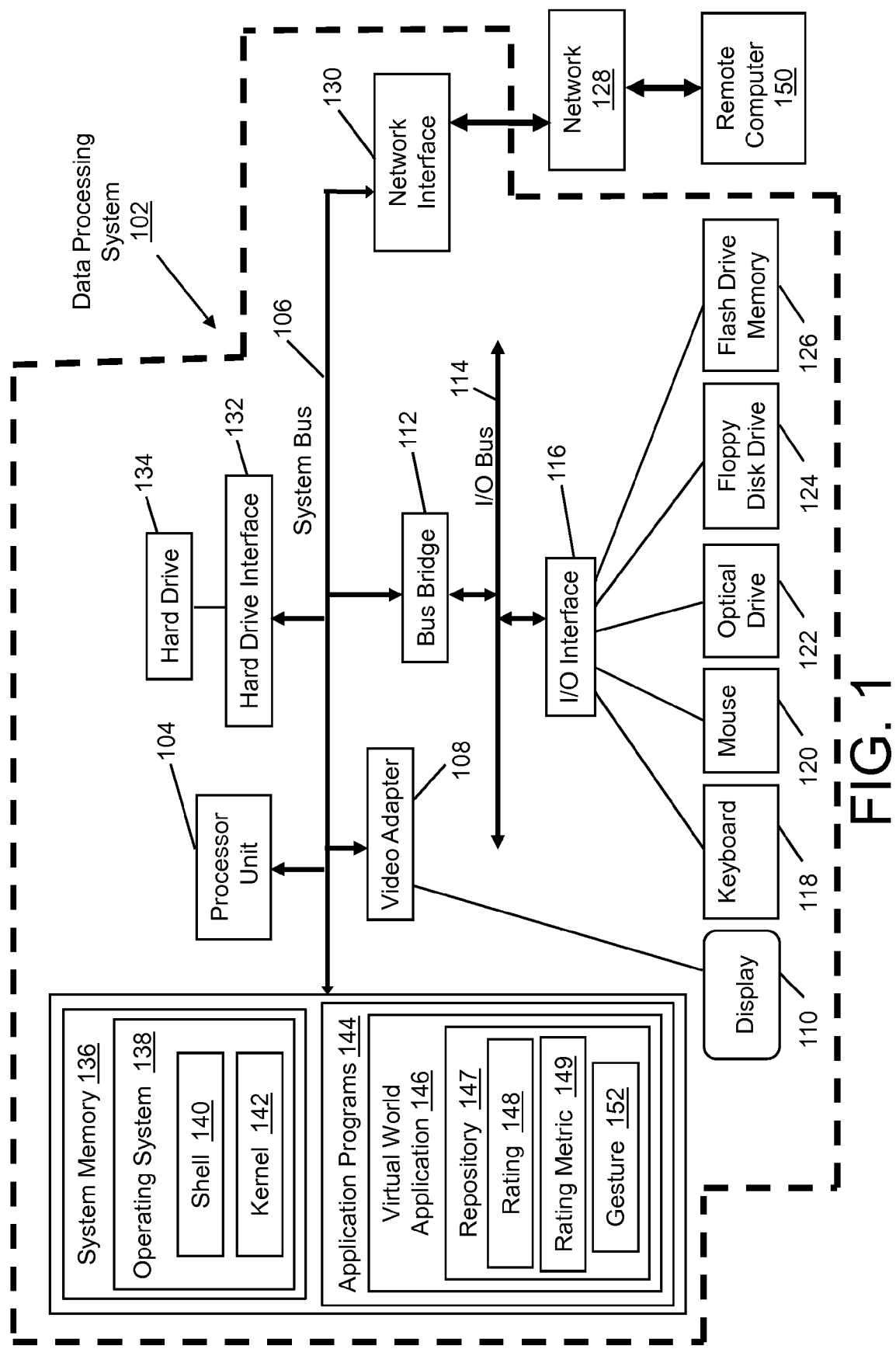
FIG. 1 is a block diagram of an exemplary data processing system in which the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In a preferred embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include virtual world application 146, which enables data processing system 102 to communicate with remote computer 150 over network 128. Virtual world application 146 includes repository 147, which is used to store items that are associated with an avatar of a user of virtual world application 146. Repository 147 includes gestures 152, which can be exchanged with a user of remote computer 150 in accordance with one or more embodiments of the present invention. Repository 147 also includes rating 148 and rating metric 149 which are disclosed in further detail in FIG. 2 below.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Figure 2:
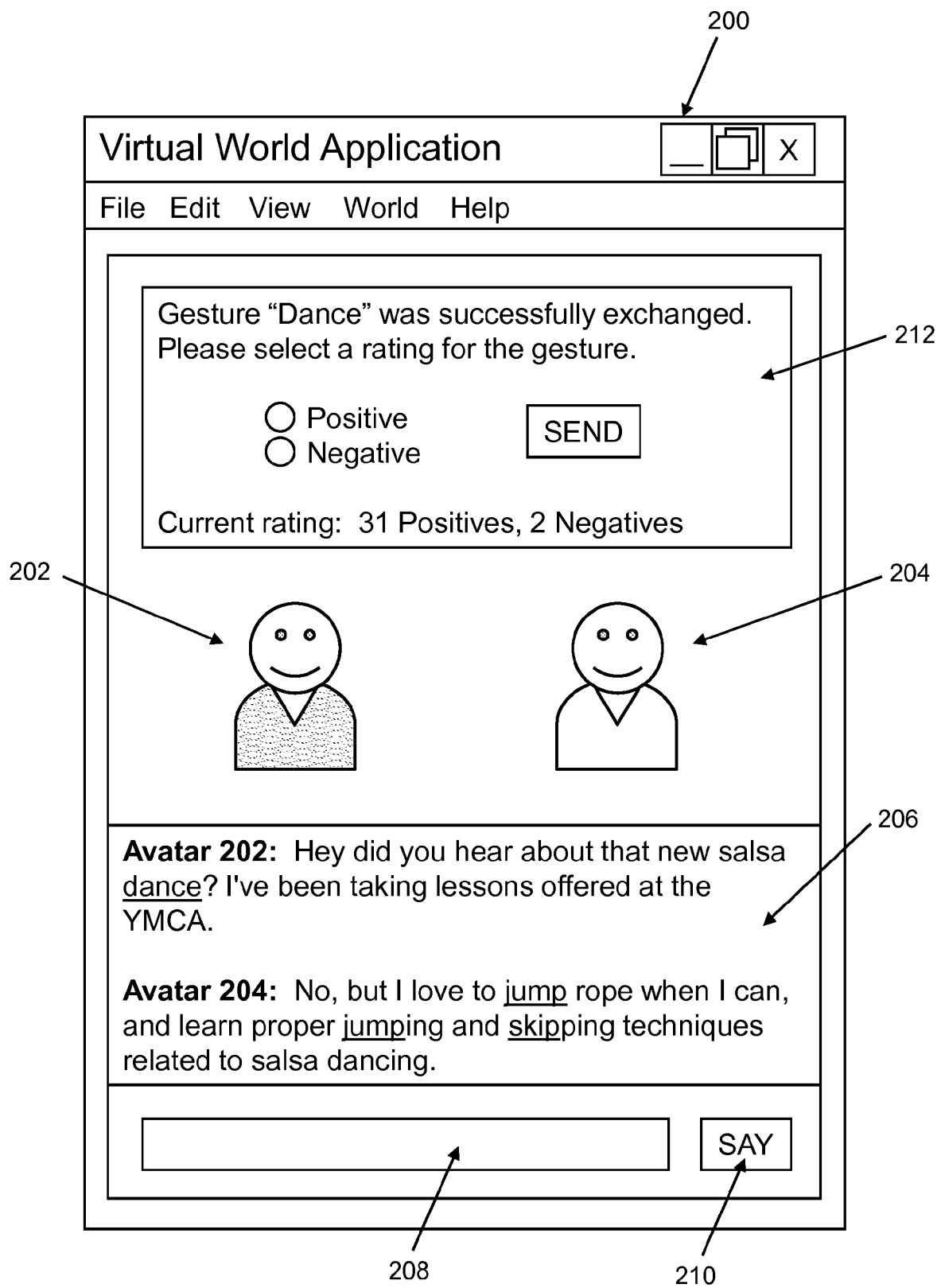
FIG. 2 shows a diagram of an exemplary virtual world application in which the present invention may be implemented.

With reference now to FIG. 2, a diagram of an exemplary user interface of a virtual world application is shown in accordance with one or more embodiments of the present invention. A user is engaged in a localized chat communication with a remote user using virtual world application 146. The user is represented by avatar 202. The remote user is represented by avatar 204. Virtual world application window 200 displays avatar 202 and avatar 204 to the user. The user enters text to be communicated with the remote user via text entry field 208 and transmits the text to the remote user by selecting "say" button 210. Text transmitted by either user may appear in chat window 206 in the order in which the text was transmitted, thereby enabling the users to engage in a dialog. Alternatively, the transmitted text may be displayed in proximity to the avatar corresponding to the user transmitting the text to create the appearance that one avatar is speaking to the other within virtual world application 146.

Gestures 152 within virtual world application 146 are enabled for exchange with other users. For example, virtual world application 146 identifies keywords corresponding to a gesture 152 in text transmitted by a remote user to the user. If virtual world application 146 identifies a keyword in the text, virtual world application 146 displays a user-selectable indication to the remote user to indicate that a gesture 152 corresponding to the indentified keyword is available for exchange with the remote user. For example, as shown in FIG. 2, a remote user with a gesture exchange functionality enabled transmits the following text to a remote user, "Hey did you hear about that new salsa dance? I've been taking lessons offered at the YMCA." Virtual word application 146 identifies the word "dance" as a keyword for a gesture 152 that enables avatar 202 to perform a dancing animation. Virtual world application 146 displays the world "dance" with a hyperlink that, when selected by the user, enables the user to receive and save the gesture 152 corresponding to the "dance" keyword in repository 147 of the user. The gesture 152 can be temporarily saved for demonstration or permanently stored in repository 147 of the user. The gesture 152 may be saved for free or the gesture 152 can be saved for a fee.

In one embodiment, once the gesture 152 is successfully exchanged (either permanently saved or for demonstration only) the user is prompted to provide rating 148 the gesture 152. Rating window 212 displays a prompt to the user with a user-selectable indication for providing feedback type rating for the gesture 152. For example, the user may select a "positive" rating if the user likes the gesture 152 and would recommend it to others. Or the user can select a "negative" rating if the user did not like the gesture 152 and does not recommend it to others. Rating 148 is received by the virtual world application 146 and stored in repository 147 of the remote user who owns the gesture. The received rating is then used to determine rating metric 149. Rating metric 149 can be displayed to another user to assist that user in deciding whether or not to exchange the gesture 152. Rating metric 149 is shown in rating window 212 as 31 positive ratings and 2 negative ratings.

In an alternative embodiment, rating 148 is a derived popularity type rating. The derived popularity type rating indicates the number of times the gesture 152 has been saved or purchased. A user can use this information to determine if the user would be interested in the gesture 152 based on the popularity of the gesture 152. If a user elects to save the gesture 152 in repository 147, then virtual world application 146 records rating 148 in the repository of the owning user. Virtual world application 146 then determines rating metric 149 by calculating the number of times a gesture has been saved and by whom.

In another alternative embodiment, rating 148 is a content type rating. A content type rating enables a user to make an informed decision about the appropriateness of the content of the gesture 152 prior to exchanging the gesture 152. An example of a content type rating is a rating of "T", which indicates the content of the gesture 152 is appropriate for teenage users, but not users of a younger age. A rating of "M" indicates the content is for a mature user over a predetermined age for adults. A rating of "C" indicates that the gesture 152 is appropriate of users of any age, including children. Virtual world application 146 receives rating 148 for a gesture 152. Rating 148 could be from a user authorized to assign ratings such as the developer of the gesture 152, a system administrator or a third-party rating authority. Rating metric 149 is determined from rating 148. Alternatively, rating 148 can come from any user and virtual world application 146 uses all ratings to determine an appropriate rating metric 149 for the gesture 152.

For gestures that are exchanged for a fee, rating metric 149 can be used to determine the price of the gesture. The price of the gesture can be increased in response to a more favorable or a more popular rating metric 149. Similarly, the price can be lowered in response to a less favorable or less popular rating metric 149.

Figure 3:
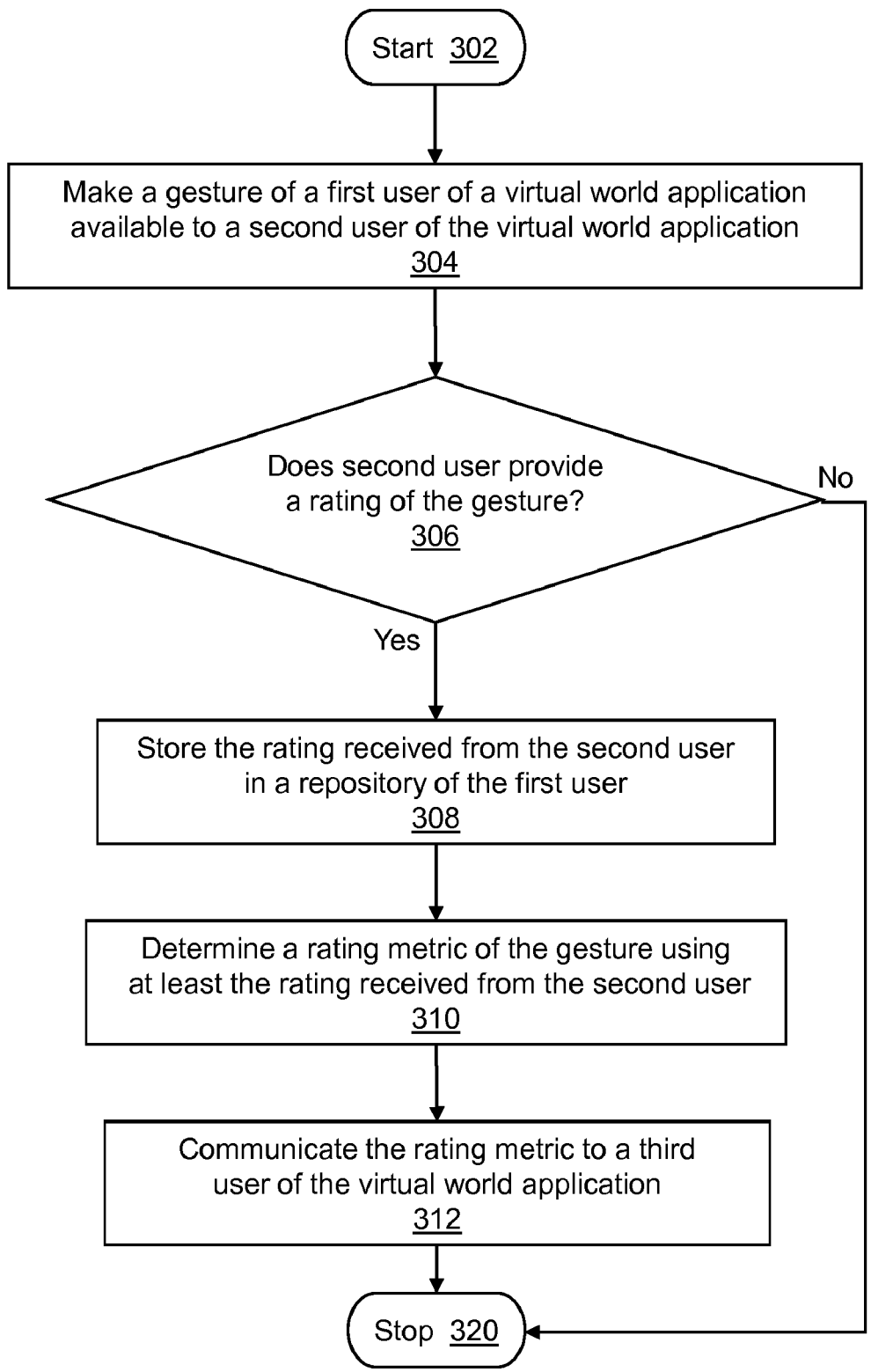
FIG. 3 shows a flowchart depicting a method for rating exchangeable gestures between users in a virtual world application, in accordance with one or more embodiments of the present invention.

With reference now to FIG. 3, a flowchart is shown depicting a method, in accordance with one or more embodiments of the present invention, for rating exchangeable gestures in a virtual world application. The process starts at initiator 302. Virtual world application 146 makes a gesture owned by a first user of virtual world application 146 available to a second user (step 304). A gesture is "owned by" a user if the gesture 152 is stored in a repository 147 of the user or in a repository to which the user has access. Virtual world application 146 determines whether the second user provides a rating of the exchangeable gesture (step 306). In response to the second user providing a rating of the exchangeable gesture, virtual world application 146 stores the rating received from the second user in a repository of the first user (step 308). Virtual world application 146 determines a rating metric of the gesture using the rating received from the second user (step 310). Virtual world application 146 communicates the rating metric to a third user of the virtual world application (step 312). The process ends at terminator 320.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A computer-implemented method in a data processing system for rating exchangeable gestures in a virtual world application, said computer-implemented method comprising:
   making a gesture owned by a first user of said virtual world application available to a second user of said virtual world application, wherein execution of the gesture triggers a specific type of animation of an avatar on a display;
   in response to the avatar performing the specific type of animation, populating the display with a rating window, wherein the rating window prompts the second user to select and transmit a rating for the gesture;
   responsive to said second user providing the rating of said gesture:
       storing said rating in a repository of said first user;
       determining a rating metric of said gesture using said rating received from said second user; and
       communicating said rating metric to a third user of said virtual world application; and
   in response to the third user selecting the gesture, transmitting the gesture to the third user, wherein the third user selects the gesture based on the rating metric;

identifying a keyword that is typed into the virtual world application, wherein identification of the keyword causes the avatar on the display to perform the specific type of animation; and populating the rating window with the keyword in order to identify the gesture that is being rated.

2. The computer-implemented method of claim 1, wherein said determining further includes calculating said rating metric according to a number of times said gesture has been saved by other users of said virtual world application.

3. The computer-implemented method of claim 1, wherein said rating received from said second user comprises a feedback rating indicating a preference of said second user.

4. The computer-implemented method of claim 1, wherein said rating metric is a content rating to inform said third user of the content of said gesture prior to exchanging said gesture.

5. The computer-implemented method of claim 1, wherein a fee for exchanging said gesture is determined using said rating metric.

6. The computer-implemented method of claim 1, further comprising:

in response to the second user saving the gesture, storing said rating in the repository of said first user.

7. The computer-implemented method of claim 1, further comprising:

adjusting a price for using the gesture based on the rating of the gesture.

8. A data processing system for rating exchangeable gestures in a virtual world application comprising:

a processor;

a memory coupled to said processor;

a virtual world application populating said memory, wherein said virtual world application comprises computer-executable instructions for:

making a gesture owned by a first user of said virtual world application available to a second user of said virtual world application, wherein execution of the gesture triggers a specific type of animation of an avatar on a display;

in response to the avatar performing the specific type of animation, populating the display with a rating window, wherein the rating window prompts the second user to select and transmit a rating for the gesture;

responsive to said second user providing a rating of said gesture:

storing said rating in a repository of said first user;

determining a rating metric of said gesture using said rating received from said second user; and communicating said rating metric to a third user of said virtual world application;

identifying a keyword that is typed into the virtual world application, wherein identification of the keyword causes the avatar on the display to perform the specific type of animation; and populating the rating window with the keyword in order to identify the gesture that is being rated.

9. The data processing system of claim 8, wherein said computer-executable instructions for determining further include using said rating received from said second user and a rating previously stored in said repository.

10. The data processing system of claim 8, wherein said computer-executable instructions for determining further include calculating said rating metric according to a number of times said gesture has been saved by other users of said virtual world application.

11. The data processing system of claim 8, wherein said rating received from said second user comprises a feedback rating indicating a preference of said second user.

12. The data processing system of claim 8, wherein said rating metric is a content rating to inform said third user of the content of said gesture prior to exchanging said gesture.

13. The data processing system of claim 8, wherein said computer-executable instructions further comprise determining a fee for exchanging said gesture using said rating metric.

14. A tangible computer-readable storage medium encoded with a computer program product comprising computer-executable instructions for:

making a gesture owned by a first user of said virtual world application available to a second user of said virtual world application, wherein execution of the gesture triggers a specific type of animation of an avatar on a display;

in response to the avatar performing the specific type of animation, populating the display with a rating window, wherein the rating window prompts the second user to select and transmit a rating for the gesture;

responsive to said second user providing a rating of said gesture:

storing said rating in a repository of said first user;

determining a rating metric of said gesture using said rating received from said second user; and communicating said rating metric to a third user of said virtual world application;

identifying a keyword that is typed into the virtual world application, wherein identification of the keyword causes the avatar on the display to perform the specific type of animation; and populating the rating window with the keyword in order to identify the gesture that is being rated.

15. The tangible computer-readable storage medium of claim 14, wherein said determining further includes using said rating received from said second user and a rating previously stored in said repository.

16. The tangible computer-readable storage medium of claim 14, wherein said determining further includes calculating said rating metric according to a number of times said gesture has been saved by other users of said virtual world application.

17. The tangible computer-readable storage medium of claim 14, wherein said rating received from said second user comprises a feedback rating indicating a preference of said second user.

18. The tangible computer-readable storage medium of claim 14, wherein said rating metric is a content rating to inform said third user of the content of said gesture prior to exchanging said gesture.

19. The tangible computer-readable storage medium of claim 14, wherein a fee for exchanging said gesture is determined using said rating metric.

* * * * *